Patented Dec. 24, 1929

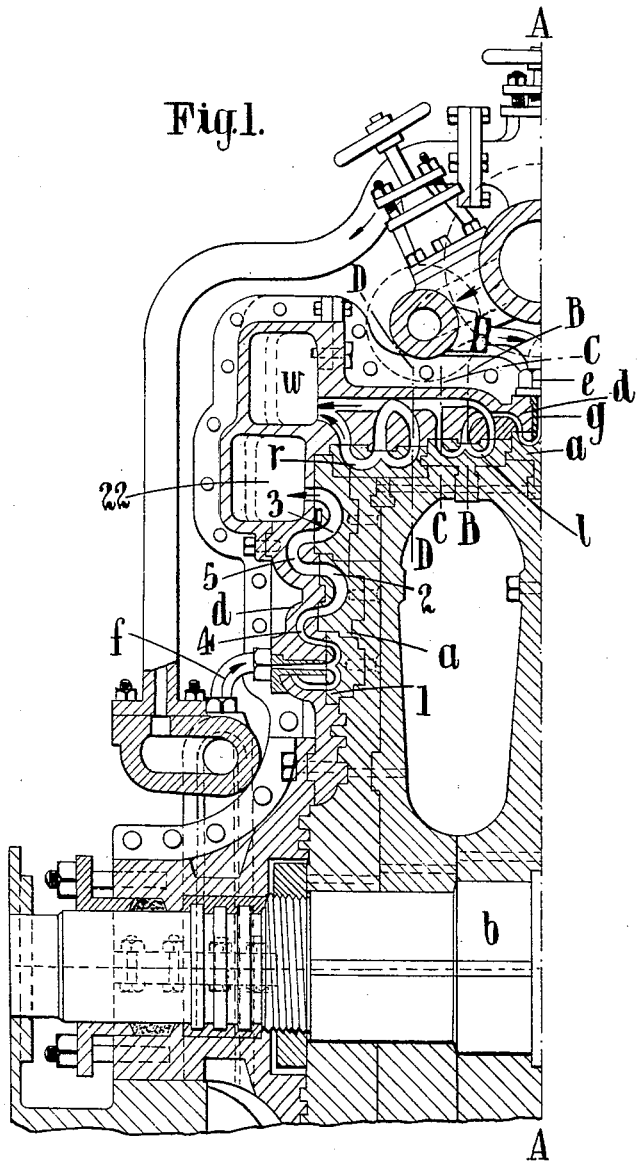

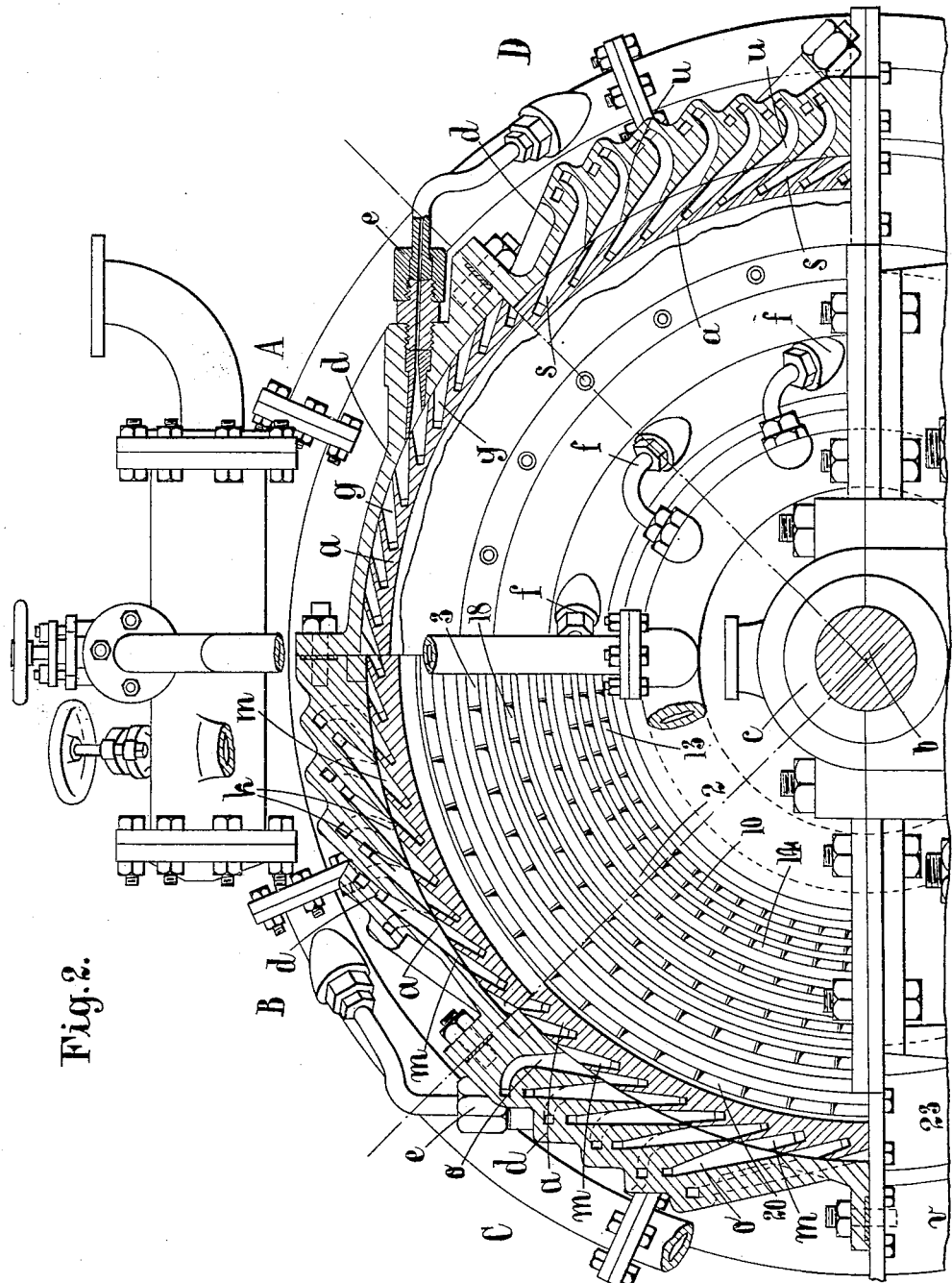

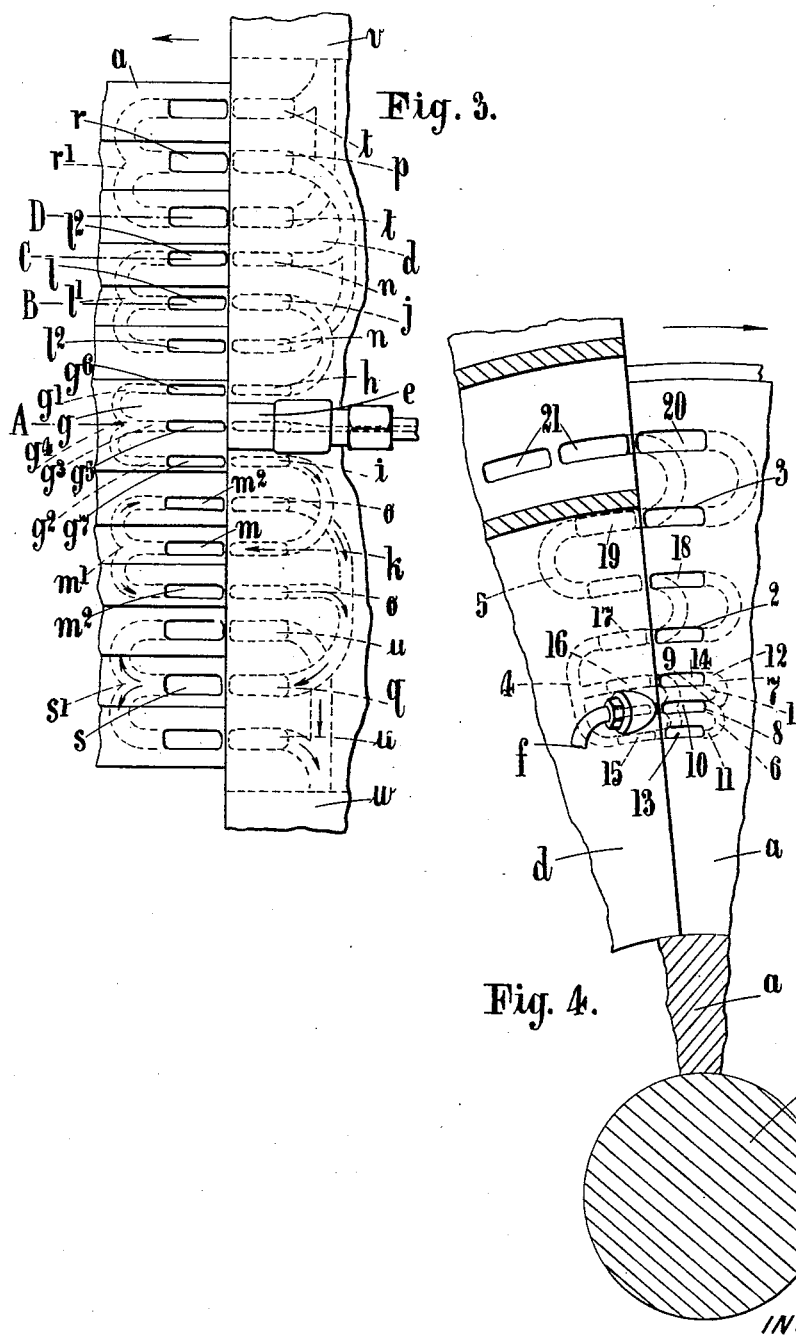

1,741,072

UNITED STATES PATENT OFFICE

GORDON PITT, OF LONDON, ENGLAND, ASSIGNOR TO P. AND F. ENGINEERING SYNDICATE LIMITED, OF LONDON, ENGLAND, A COMPANY OF GREAT BRITAIN AND IRELAND

ROTARY ENGINE

Application filed August 1, 1927, Serial No. 209,785, and in Great Britain August 10, 1926.

This invention relates to turbines or rotary engines and has for its object improvements whereby a larger proportion of the kinetic energy of the motive fluid employed is utilized. A further object of the present invention is to eliminate the delicate "blades" used in most other turbines and thus to provide greater robustness of construction and to reduce the risk of mechanical damage.

These improvements consist in providing passages or ducts of the form hereinafter described, in the adjacent surfaces of the rotor and stator by means of which steam or other motive fluid (hereinafter deemed to be included in the term "steam") directed into buckets formed in the rotor, firstly imparts an impulse to the said rotor by the impact, whereafter the direction of the steam is changed and exhausts into passages in the stator thereby imparting a second impulse to the rotor by the reaction. The direction of the exhaust steam in the stator may be again changed and may afterwards emerge through a second nozzle in the stator that directs the steam exhausted from the first bucket into a second bucket in the rotor in which case another impulse is imparted to the rotor by the second impact, whereafter the direction of the steam delivered into the second bucket is again changed and exhausts into other passages in the stator by which its direction may be again changed in which case the steam would issue through other nozzles which direct it into one or more other buckets in the rotor, of a similar character to those hereinbefore described. In this way the cycle of operations is repeated until the entire expansive effort of the steam has been utilized.

According to one mode of carrying out the present invention, steam is led through one or more nozzles in the stator or in plates secured to it, that direct a suitable number of jets of steam into inclined buckets formed in the rotor wherein the steam impinges on a knife-edge that divides and deflects it into two similar substantially U-shaped channels in the rotor. These channels when situated at or near the periphery of the rotor lie in planes that are tangential to an arc of smaller radius than that of the rotor, and when situated in the sides of the rotor lie in planes that are inclined to the said sides. With this arrangement the rotor is caused to rotate and the steam passes through the aforesaid U-shaped channels into exhaust passages in the stator on each side of the live-steam nozzle. These exhaust passages may lead to one or more lower pressure nozzles that direct the steam into one or more other buckets as hereinbefore explained or direct into a main exhaust pipe.

The buckets in the rotor may be situated side by side in the same rotor at the same distance from its axis or at a greater or less distance therefrom. Or, they may be situated in one or more other rotor discs. In this way the expansive force of the steam is utilized in successive stages and the sequence of operations is continued stage by stage until the whole of the expansive effort of the steam has been applied whereafter it finally exhausts either to the atmosphere or to a suitable condenser.

When a plurality of live-steam inlet nozzles is employed, they may be spaced circumferentially around the cylindrical casing or stator and each pair of U-shaped channels in the rotor is, after it has passed the cooperating exhaust ports in the stator, brought by such rotation in front of the next live-steam nozzle which delivers a fresh supply of steam into it. This steam in passing through the exhaust channels and the other buckets in the series, imparts during its expansion additional impulses to the rotor. These nozzles may be grouped in two or more sets and the individual members of each set may be interposed between the members of the other set or sets and each group may be under separate control. This enables the amount of steam admitted to the machine to be readily controlled without risk of possible wiredrawing.

In order that greater advantage may be taken of the energy of the motive fluid, the adjacent surfaces of the stator and rotor in which the inlet and exhaust passages and the buckets are respectively situated, are provided with annular rims or flanges that fit into grooves in the other part and are separated by a minimum clearance space which is filled by a film of condensed steam that is retained there by capillary force. In this way tip leak is minimized and by elongating the adjacent ends of the ports and channels the motive fluid is enabled to act upon the rotor through a greater angle of rotation.

Inasmuch as the direction of the plane (or planes) in which the buckets in the rotor lie determines the direction of rotation, it is possible, with this invention, to provide separate series of buckets set at different angles and in different zones in the same rotor, and, by supplying the separate series of buckets with steam from suitably situated nozzles under separate control, to cause the rotor to rotate either clockwise or counter-clockwise by manipulation of the steam supply only. In one form of this rotary engine such a reversing arrangement may be incorporated in one or more of a plurality of rotor discs mounted on a common shaft. Or separate rotor discs, cylinders or the like adapted for reverse rotation only, may be mounted on the same shaft as those adapted for "ahead" rotation. According to another construction both arrangements may be incorporated in the same engine.

In order that the present invention may be clearly understood I will now describe it more particularly and for this purpose reference will be made to the accompanying drawings in which—

Fig. 1 is a quarter sectional view of the improved rotary engine in a plane passing through the axis of the rotor, showing the buckets, exhaust ports and steam channels diagrammatically as lying in the plane of the section, Fig. 2 is an irregular transverse section of part of the rotary engine shown in Fig. 1, in which the planes of section at the circumference of the sectors marked A, B, C, D are respectively indicated by the broken lines A—A, B—B, C—C, D—D in Fig. 1, Fig. 3 is an outside view of a portion of the engine adjacent to one of the "ahead" live-steam nozzles on an enlarged scale, showing the stator partly broken away so as to expose a portion of the circumferential surface of the rotor, and Fig. 4 is an outside view of another portion of the engine adjacent to one of the "reverse" live-steam nozzles, also on an enlarged scale, and showing the stator partly broken away so as to expose a portion of the side face of the rotor, According to the construction illustrated by the drawings a rotor $a$ mounted on a shaft $b$ journalled in suitable bearings $c$ is adapted to rotate in a stator $d$ through the wall of which "ahead" live-steam nozzles $e$ and "reverse" live-steam nozzles $f$ pass so as to deliver live steam into the high pressure bucket of each set of a plurality of sets of buckets distributed over the circumferential surface and side faces of the rotor in the manner hereinafter described.

The stator casing is supported centrally at the bearing and by flanges to permit freedom of expansion and contraction due to varying temperatures, whereby the shaft remains in true alignment.

The circumferential buckets of each set are disposed in a line parallel to the axis extending across the width of the rotor from side to side as is shown in Fig. 3.

The high pressure bucket $g$ of each set of circumferential buckets is situated at the centre of the set.

Each of these buckets has the form of two U-shaped channels $g^1$, $g^2$ joined together, which lie in a plane that is tangential to an arc of slightly less diameter than that of the rotor as is shown in the sector A of Fig. 2. The common leg $g^3$ of the two U-shaped channels has a knife-edge $g^4$ opposite the bucket mouth $g^5$ on to which live steam is directed by the nozzle $e$ during the time the bucket mouth which is elongated is passing the said nozzle when the engine is running.

This knife-edge divides the steam-jet into two streams which are diverted by the curved sides of the knife edge into the oppositely-directed limbs $g^1$, $g^2$ of the U-shaped channels whence it is exhausted through the ports $g^6$, $g^7$ into the exhaust passages $h$ $i$ in the stator by which it is led to low pressure nozzles $j$ $k$ which direct the exhaust steam into buckets $l$ $m$ of similar formation to but of larger dimensions than the bucket $g$.

The steam delivered into the buckets $l$ $m$ which is of lower pressure is directed on to the knife edges $l^1$ $m^1$ by which it is again divided and diverted into the U-shaped channels on each side of them whence it is exhausted through the ports $l^2$ $m^2$ into the exhaust passages $n$ $o$ in the stator by which it is again led to low pressure nozzles $p$ $q$ which direct the exhaust steam into buckets $r$ $s$ of similar formation to but of still larger dimensions than the buckets $l$ $m$.

The steam delivered into the buckets $r$ $s$ which is of still lower pressure, is directed on to the knife edges $r^1$ $s^1$ by which it is again divided and diverted into the U-shaped channels on each side of them whence it passes through the exhaust passages $t$ $u$ in the stator into the main exhaust pipes $v$ $w$ on each side of the stator and thence to a condenser.

When the nozzle $e$ is over a bucket mouth $g^5$ an impulse—resulting from the impact of the steam against the bottom of the buckets $g$, $l$, $m$, $r$, $s$ and from the reaction caused by the exhaust steam when it strikes against the bottom of the ten co-operating exhaust passages in the stator—is imparted to the rotor in the "ahead" direction, but immediately after this position is passed the said nozzle will deliver steam to the next bucket mouth $g$ that is approaching it as well as to the one that is passing away from it. In this position two buckets $g$ receive steam and as each of their exhaust channels are during this period over two exhaust passages $h$ in the stator the exhaust steam will at the next stage issue from three nozzles $j$ or $k$ on each side of the central bucket $g$. As each of these nozzles is over two buckets $l$ or $m$ the three nozzles on each side will direct the lower pressure steam into four buckets $l$ or $m$ whose exhaust channels will each be over two exhaust passages $n$ or $o$ in the stator that will lead the exhaust steam to five nozzles $p$ or $q$ which will direct still lower pressure steam into six buckets $r$ or $s$. These will in like manner exhaust into seven exhaust passages $t$ or $u$ in the stator from which the exhaust steam will pass into one or other of the main exhaust pipes $v$ and $w$ and thence to a condenser (not shown).

In this way the steam from each nozzle $e$ will act on twenty-two buckets in the rotor and react against forty-four exhaust passages in the stator.

In order to insure the complete scavenging of the buckets and exhaust passages, the mouths of the outermost exhaust passages in the stator are lengthened so as to embrace the exhaust port of the last bucket of the series in front of and behind those receiving steam.

Radial sets of reversely inclined buckets 1, 2, 3 are provided on the faces of the rotor $a$. These buckets exhaust into U-shaped passages 4, 5, in the opposing surfaces of the stator $d$ through which the "reverse" live steam nozzles $f$ also pass.

The high pressure bucket 1 of each set has the form of two U-shaped channels 6, 7 joined together. The common leg 8 of these channels has a knife-edge 9 opposite the bucket mouth 10 on to which live steam is directed by the nozzle $f$ during the time the bucket mouth which is elongated is passing the said nozzle when the engine is running. This knife-edge divides the steam jet into two streams which are diverted by the curved sides of the knife-edge into the oppositely-directed limbs 11, 12 of the U-shaped channels whence it exhausts through the ports 13, 14 into the exhaust passages 15, 16 in the stator by which it is led to the low pressure nozzle 17 that directs the exhaust steam into the single U-shaped bucket 2 of larger dimensions than the bucket 1.

The steam delivered into bucket 2 which is of lower pressure is diverted into the other arm whence it is exhausted through the port 18 into the exhaust passage 5 in the stator by which it is again led to the low pressure nozzle 19 which directs the exhaust steam into the low pressure bucket 3.

The steam delivered into the bucket 3 which is of still lower pressure is diverted into the other arm whence it passes through the ports 20, 21 into the main exhaust pipes 22 or 23 and thence to the condenser.

When the nozzle $f$ is over the bucket mouth 10 an impulse—resulting from the impact of the steam against the bottom of the buckets 1, 2, 3 and from the reaction caused by the exhaust steam when it strikes against the bottom of the three co-operating exhaust passages in the stator—is imparted to the rotor in the "reverse" direction but immediately after this position is passed the said nozzle will deliver steam to the next bucket mouth 10 that is approaching it as well as to the one that is passing away from it. In this position two buckets 1 receive steam and as each of their exhaust channels is during this period over two exhaust passages 15, 16 in the stator the exhaust steam will at the next stage issue from three nozzles 17. As each of the nozzles 17 is over two buckets 2 the three nozzles will direct the lower pressure steam into four buckets 2 whose exhaust channels will each be over two exhaust passages 5 in the stator that will lead the exhaust steam to five nozzles 19 which will direct still lower pressure steam into six buckets 3 from which the steam will pass through their exhaust channels into the main exhaust pipe by way of the ports 20, 21.

In this way the steam from each nozzle $f$ will act on twelve buckets in the rotor and react against twelve exhaust passages in the stator.

Steam enters the steam chest 25 through a pipe 24 and is supplied to the two annular pipes 27 and 28 that feed the nozzles $e$ through connections 26 provided with suitable control valves 29. Steam is also supplied to the annular pipes 31 on both sides of the engine that feed the nozzles $f$, by pipes 30 which are also controlled by suitable valves.

The clearance space between the rotor and stator is reduced to a minimum and is interrupted by annular rings or flanges on one of the said parts that extend into grooves in the other which also have a minimum clearance between them so as to offer a maximum resistance to the passage of the motive fluid between them.

The mouths of the buckets and exhaust passages are wider than their co-operating nozzles and ports and are separated from the corresponding buckets and exhaust passages of the sets behind and in front of them by knife edge partitions in order that a path of less resistance may be provided through them than through the space between the stator and rotor which is substantially sealed by condensed vapour or other moisture deposited on the rotor which is thrown by centrifugal force into the clearance spaces at and near its periphery.

I claim:

1. A rotary engine comprising in combination a rotor provided with buckets constituted by enclosed U-shaped channels, a stator supported concentrically on the rotor shaft, annular rings formed integrally on the adjacent surfaces of the stator and rotor, channels between said rings into which the rings on the adjacent part fit with a minimum clearance space between them, U-shaped buckets in the rotor, a nozzle in said stator to direct the motive fluid into one leg of successive U-shaped buckets situated in the rotor in the same plane as said nozzle, U-shaped enclosed exhaust channels in the inner surface of the stator having one leg in the same plane as the second leg of the said buckets so as to receive the motive fluid exhausted therefrom and having its second leg in the same plane as and in a position to direct said motive fluid into the first leg of two U-shaped buckets of an annular series situated in the rotor in a plane parallel to the first series and means of preventing the rotation of the stator substantially as set forth.

2. A rotary engine comprising in combination a rotor provided with a plurality of annular rows of buckets each of which except those in the central row is constituted by an enclosed U-shaped channel and those in the central row are each constituted by a pair of enclosed U-shaped channels arranged side by side with the adjacent leg of each joined together so as to form an internal knife-edge at the junction of their curved portions; a stator supported concentrically on the rotor shaft; annular rings formed integrally on the adjacent surfaces of the stator and rotor; channels between said rings into which the rings on the adjacent part fit with a minimum clearance space between them; a plurality of nozzles in said stator to direct the motive fluid into the common leg of the central row of buckets; a valve to control the motive fluid in each nozzle; a plurality of annular rows of U-shaped enclosed exhaust channels in the inner surface of the stator each of which exhaust channel in the rows next the central row has one leg in the same plane as the adjacent outer legs of the buckets in that row so as to receive the motive fluid exhausted therefrom and the other leg of said exhaust channel in the same plane as and in a position to direct said motive fluid into the first leg of two U-shaped buckets in the next annular row on the rotor, the second legs of which are each in the same plane as and in a position to direct said motive fluid into the first leg of two U-shaped enclosed exhaust channels in the next annular row in the stator whose second legs are each in the same plane as and in a position to direct said motive fluid into the first leg of two U-shaped buckets in the next annular row on the rotor and so on successively in order to direct lower pressure steam into an increasing number of buckets, and means of preventing the rotation of the stator substantially as set forth.

3. In a rotary engine comprising a rotor provided with a plurality of annular rows of buckets and a stator provided with a plurality of annular rows of exhaust channels to receive the motive fluid exhausted from one row of buckets and direct it into the next row, a central annular row of buckets on said rotor each of which is constituted by a pair of enclosed U-shaped channels arranged side by side with the adjacent leg of each jointed together so as to form an internal knife-edge at the junction of their curved portions substantially as set forth.

In testimony whereof, I have signed my name to this specification at 61 and 62, Chancery Lane, London, W. C. 2, England, this 12th day of July, 1927.

GORDON PITT.